United States Patent [19]

Nambu

[11] Patent Number: 4,811,551
[45] Date of Patent: Mar. 14, 1989

[54] PACKAGING APPARATUS FOR PACKAGING EGGS, ETC.

[75] Inventor: Yukio Nambu, Kameoka, Japan

[73] Assignee: Nambu Electric Co., Ltd., Kyoto, Japan

[21] Appl. No.: 205,503

[22] PCT Filed: Apr. 28, 1986

[86] PCT No.: PCT/JP86/00214
§ 371 Date: Dec. 12, 1986
§ 102(e) Date: Dec. 12, 1986

[87] PCT Pub. No.: WO86/06304
PCT Pub. Date: Nov. 6, 1986

Related U.S. Application Data

[63] Continuation of Ser. No. 7,968, Dec. 12, 1986, abandoned.

[30] Foreign Application Priority Data

Apr. 30, 1985 [JP] Japan .................................. 60-92966

[51] Int. Cl.⁴ ..................... B65B 57/14; B65B 57/20; B65B 23/06
[52] U.S. Cl. ..................... 53/500; 53/501; 53/502; 53/155; 53/238

[58] Field of Search .................. 53/155, 238, 502, 500, 53/501; 209/513, 592, 593

[56] References Cited

U.S. PATENT DOCUMENTS

| | | | |
|---|---|---|---|
| 3,244,278 | 4/1966 | Weprin | 53/502 X |
| 3,708,025 | 1/1973 | Sorer | 209/593 X |
| 3,720,276 | 3/1973 | Ranks | 53/502 X |
| 3,907,112 | 9/1975 | Shepovalov | 209/513 |
| 3,974,888 | 8/1976 | Murakami | 209/593 X |
| 4,599,272 | 10/1985 | Hagan | 209/525 X |

FOREIGN PATENT DOCUMENTS 5543969 11/1980 Japan .

*Primary Examiner*—John Sipos
*Attorney, Agent, or Firm*—Oblon, Fisher, Spivak, McClelland & Maier

[57] ABSTRACT

A packaging apparatus for successively packaging hen's eggs to obtain packs of eggs, in which the eggs to be packed are successively conveyed, the weight of each of the eggs conveyed is detected, then the eggs are divided and accumulated in the respective regions according to the detected weight, then a predetermined number of eggs are taken out from each region to form a set of eggs to be contained in one pack, and this set of eggs are placed in a plastic packaging container.

7 Claims, 2 Drawing Sheets

PACKAGING APPARATUS FOR PACKAGING EGGS, ETC.

This application is a continuation of application Ser. No. 07/007,968 filed on Dec. 12, 1986, now abandoned.

TECHNICAL FIELD

This invention relates to a packaging apparatus for packaging hen's eggs, fruits, etc., into the packs containing a predetermined number of pieces of said commodities.

BACKGROUND ART

According to the weight standards for hen's eggs for instance, they are classified by weight into the following divisions: SS (40 g to not greater than 46 g), S (46 g to not greater than 52 g), MS (52 g to not greater than 58 g), M (58 g to not greater than 64 g), L (64 g to not greater than 70 g), 2L (70 g to not greater than 76 g) and substandard division. According t the conventional packaging machines, only the eggs having the weights within one weight division have been packed in one packaging container. Generally, there is a tendency that the consumers buy the packs of eggs of certain weight divisions. Consequently, there arises a situation where the packs containing the eggs of certain weight divisions, for example, L and M divisions, have a good sale while the packs of eggs of other divisions do not have a good sale, with the result that the commercial value of the eggs of other weight divisions than L and M drops.

In order to eliminate such impropriety, it is suggested to contain the eggs of various weight divisions in one pack in such a way that the individual packs will become substantially equal to each other in weight and to put such packs on sale. However, no packaging apparatus capable of making such packs has yet been proposed.

DISCLOSURE OF THE INVENTION

According to the present invention, there is provided a packaging apparatus by which the commodities of the same kind but differing in physical characteristics can be contained mixedly in one pack and the produced individual packs have substantially no difference from each other in weight.

More specifically, in accordance with this invention, there is provided said type of packaging apparatus comprising means for successively conveying the commodities to be packed, means for successively detecting the physical characteristics of said commodities conveyed by said conveyance means, means for sorting out said conveyed commodities according to the physical characteristics detected by said detecting means, plural means for accumulating the respective commodities sorted out by said sorting means, means for taking out a predetermined number of pieces of commodities accumulated in each of said accumulating means and forming a set of a predetermined number of pieces of commodities to be packed, and means for putting into a packaging container each of the sets of commodities to be packed formed by said forming means.

BEST MODE FOR CARRYING OUT THE INVENTION

Figure 1:
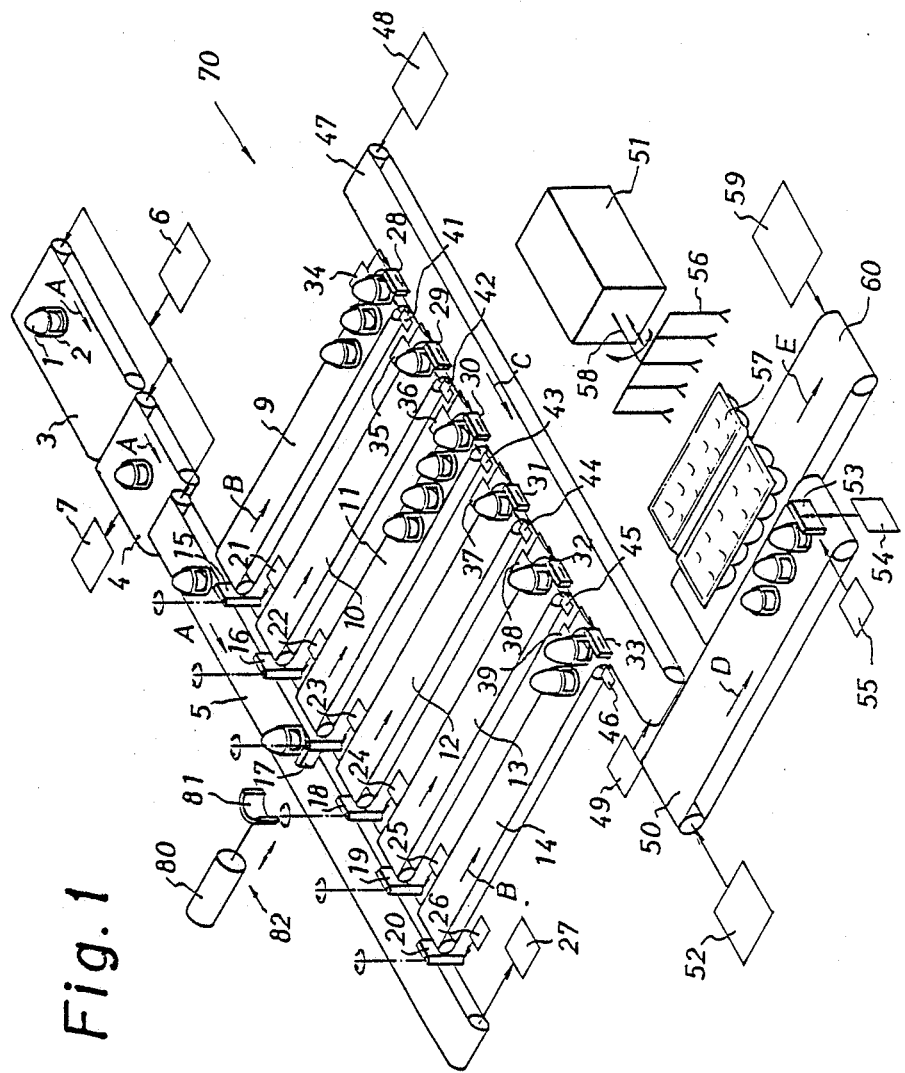
FIG. 1 shows a preferred embodiment of the present invention.
Figures 2, 3:
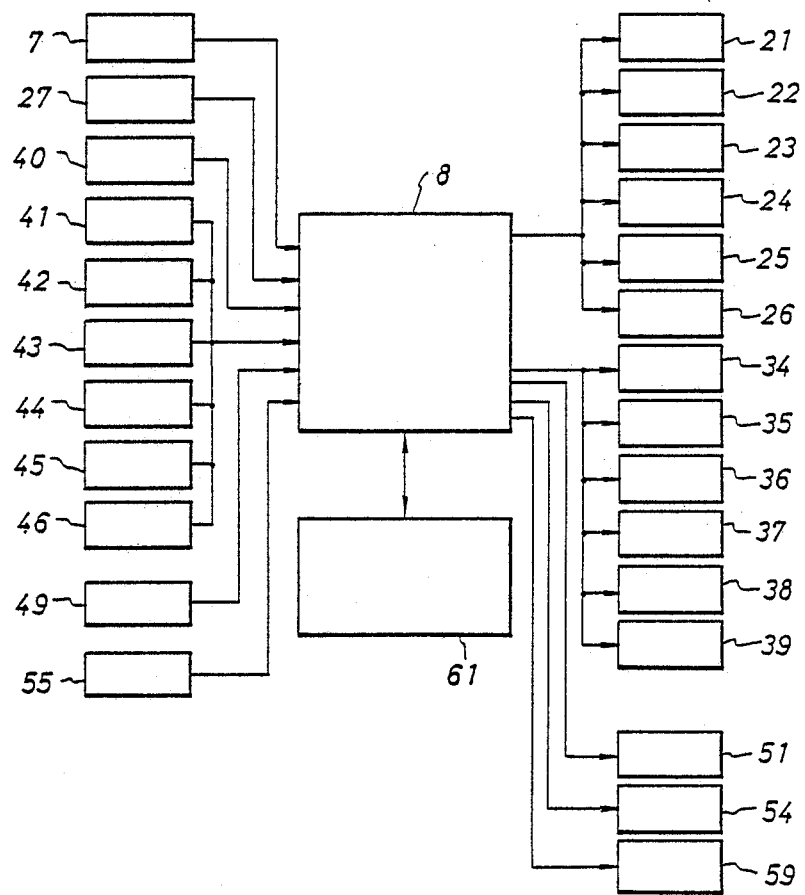
FIG. 2 shows the details of a container for conveying an egg in the apparatus shown in FIG. 1.
FIG. 3 shows an electric control circuitry adapted in the apparatus shown in FIG. 1.

In FIGS. 1 to 3, the containers 2 each holding hen's egg 1 as commodity to be packed are carried in the direction A on belt conveyors 3, 4, 5 operated by an electric motor 6. Conveyor 4 is provided with a detector 7 for detecting the weight of each egg 1 being carried, and the detected weight of each egg 1 is supplied to a control unit 8 comprising micro-computers. Always one egg 1 held in container 2 is transferred from conveyor 3 onto said conveyor 4. After the weight of the egg 1 has been detected by said detector 7, said egg 1 is then transferred onto the next conveyor 5. A series of belt conveyors 9–14 are provided along and transversely to said conveyor 5, said conveyors 9–14 being operated by an electric motor not shown. At one end of each of said conveyors 9–14 is provided sorting-out gates (15–20) each of which is operated to make a turn (open) by a corresponding electric motor (21–26). When any one of said gates 15–20 is operated to open, the container 2 holding an egg 1 transferred by said conveyor 5 is transferred onto a transverse conveyor corresponding to said particular gate. The operation of said gates 15–20 by the corresponding electric motors 21–26 is controlled by the control unit 8 which decides which of said electric motors 21–26 is to be operated to open the corresponding gate according to the detected weight of the egg signaled from detector 7 and the distance of movement of conveyor 5 detected by and signaled from detector 27 to said control unit 8. Gate 15 is designed to be opened by the operation of electric motor 21 which is operated when an egg 1 falling in the SS weight division was carried on conveyor 5 to the position adjacent to one end of conveyor 9, thus allowing said egg to be transferred onto said conveyor 9. Other gates 16–20 are similarly designed so that the eggs falling in the S weight division will be transferred onto conveyor 10, the eggs falling in the MS weight division will be transferred onto conveyor 11, the eggs falling in the M weight devision will be transferred onto conveyor 12, the eggs falling in the L weight division will be transferred onto conveyor 13, and the eggs falling in the 2L weight division will be transferred onto conveyor 14 from conveyor 5 with opening of the corresponding gates 16–20. The substandard eggs are discharged out from the downstream end of conveyor 5 and disposed as substandard eggs.

At the downstream end of each of said conveyors 9–14 is provided a crosswise movable gate (28–33). Each of said gates 28–33 is designed to be movable crosswise to the first and second positions so that when it is at its first position, it stops the movement of the egg 1 carried on the corresponding conveyor (9–14), and when it is at its second position, it releases said stopage of movement of the egg. That is, when the gate (any of 28–33) is at the position on the other (downstream) end of the corresponding belt conveyor (9–14), it checks the movement of the egg 1 carried on said conveyor to let said egg 1 and the succeeding ones stay on said conveyor as the container 2 of said egg 1 abuts against said gate, and when said gate is positioned out of the other end of said conveyor (9–14), it allows further downstream side movement of said egg 1 on said conveyor. The crosswise movements of said gates 28–33 are effectuated by the operation of the corresponding linear motors 34-39 under the control of said control unit 8. Control unit 8 operates said motors 34-39 according to the information on said combination preset by a setting device 40. The stay of the egg container 2 on any of said conveyors 9-14 by the corresponding gate (28-33) is effected by a slip between said container 2 and the corresponding conveyor (9-14) and the abutment of said container 2 against the corresponding gate (28-33). Close to the other end of each of said conveyors 9-14 is provided a non-contact type object pass detector (41-46) which is designed to detect the egg 1 transferred onto belt conveyor 47 from the corresponding conveyor (9-14). The detection signal detected by each of said detectors 41-46 is transmitted to the control unit 8 which, on receiving the object pass detection signal from any of said detectors 41-46, computes the number of the eggs transferred onto said conveyor 47 from each of said conveyors 9-14 and controls the motors 34-39 according to the value of said computation and the information set by said setting device 40. Conveyor 47 is operated by a motor 48 to convey, in the direction of C, the egg-holding containers 2 transferred onto said conveyor 47 from the conveyors 9-14.

Close to the downstream end of said conveyor 47 is provided a non-contact type object pass detector 49 similar to said detectors 41-46. This detector 49 detects each egg 1 to be transferred onto belt conveyor 50 from conveyor 47. Upon passage of every egg 1 past said detector 49, an object pass signal is issued from said detector 49 to the control unit 8 which computes said object pass signal from said detector and controls the operation of an egg lifting device 51 according to the computed value and the information set by the setting device 40. Conveyor 50 is operated by a motor 52 and conveys each egg 1 transferred from conveyor 47 in the direction of D. At the downstream end of said conveyor 50 is provided a vertically movable gate 53 which, when at its first position, checks the movement of the egg 1 in the direction of D by causing slippage between the egg container 2 and the conveyor 50 as said egg container 2 conveyed on said conveyor 50 abuts against said gate 53. When at its second position, said gate 53 permits the movement, in the direction of D, of the container 2 from which the egg 1 has been lifted off by said lifting device 51. Thus, said gate 53 is moved in the vertical direction by a linear motor 54 in such a way that when at its first position, it abuts to the container 2 conveyed (on conveyor 50) in the direction of D, and when at its second position, it keeps away from said container 2 conveyed in the direction of D. At the downstream end of said conveyor 50 is provided a noncontact type object pass detector 55 similar to said detector 49. Said detector 55, upon detecting the passage of every container 2, issues an object pass signal to the control unit 8 which computes the object pass signal from said detector 55 and operates the motor 54 according to the computed value, the information set by the setting device 40 and an operation completion signal from the lifting device 51. Thus, when the eggs 1 included in the containers 2 on the conveyor 50 are all lifted up by the lifting device 51 and a lift completion signal is issued from said lifting device 51, the control unit 8, on receiving said signal, operates the motor 54 to raise up the gate 53, allowing discharge of every empty container 2 from the downstream end of said conveyor 50, and when it receives a predetermined number of object pass signals from the detector 55, said control unit 8 again operates the motor 54 to lower down the gate 53 to its position (first position) where the eggholding container 2 conveyed on the conveyor 50 in the direction of D abuts against said gate 53 and is thereby checked against its further movement in said direction. Said lifting device 51 has the same number of suction arms 56 as the number of eggs that can be packed in a row on one side of a plastic packaging container 57. Said arms 56 suck and take up the eggs 1 from the containers 2 staying on the conveyor 50 and place said eggs in said packaging container 57. Said arms 56 are connected to a support arm 58 which is arranged turnable and telescopic. The turn and telescopic movement of said support arm 58 and the suction of said arms 56 are controlled by the control unit 8 so as to carry out lift-up of the eggs 1 from the containers 2 and placing thereof in the packaging container 57 by said arms 56. The packaging container 57 is placed on a conveyor 60 which is operated by a motor 59. When the packing of the eggs 1 in the container 57 is completed by the device 51, the conveyor 60 is operated by the motor 59 to convey the packed container 57 in the direction of E on said conveyor 60. After this packed container 57 has been discharged out, a new empty container 57 is placed on the conveyor 60 which has come to a stop. The motor 59 is operated under the control of the control unit 8 so as to let the conveyor 60 make said movement each time the packing of the eggs in the container 57 is completed by the device 51. The information set by the setting device 40 is stored in a memory 61. In the memory 61 is also stored the control program, and the control unit 8 is operated according to this control program.

The packaging apparatus 70 having the abovedescribed construction operates as follows. It is herein supposed that the packaging container 57 is so designed as to be capable of containing 10 pieces of egg in two rows, and that one piece each of the eggs in the weight divisions of SS, S, MS and 2L and three pieces each of the eggs in the weight divisions of M and L can be packed in said container 57. Therefore, this information is input by the setting device 40 and stored in the memory 61.

When the eggs 1 placed in the respective containers 2 conveyed successively on the conveyor 3 are transferred onto the next conveyor 4, the detector 7 detects the weight of each of these eggs 1 and signals the detected weight to the control unit 8. The control unit 8 computes the position of the egg 1 having the detected weight on the conveyor 5 from the distance of conveyance detected by the detector 27 and signaled to said unit 8, and when this egg reaches an end of one of the conveyors 9-14 which has been preset for receiving and carrying said particular egg of said detected weight, the corresponding one of the motors 21—26 is operated by said control unit 8 to turn (open) the corresponding gate (15-20). For example, in the case of an egg 1 having a detected weight of 65 g, when this egg 1 reaches an end of the conveyor 13, its gate 19 is turned open to let said egg transfer onto said conveyor 13. The eggs 1 having different weights are similarly transferred onto the respective conveyors 9-14. The eggs 1 thus transferred onto and carried on any of the conveyors 9-14 are amassed and stand by at the other end of the particular conveyor (9-14) as long as its gate (28-33) is left closed. In the memory 61 is stored the information of egg combination to be contained in one pack—one piece each of the eggs in the weight divisions of SS, S, MS and 2L and three pieces each of the eggs in the weight divisions of M and L, so that the control unit 8 operates the motors 34-39 so as to open the gates 28 and 29 until receiving one object pass signal from each of the detectors 41 and 42 while opening the gate 31 until receiving three object pass signals from the detector 44 in every half cycle of packaging operation. Opening and closing of the gates 28-33 are conducted in such an order that one egg 1 will not bump against another on the conveyor 47. Therefore, the gates 28-33 may be opened all simultaneously or may be opened by turns successively from the downstream side to the upstream side, or vice versa, in relation to the direction of conveyance (the direction of C) on the conveyor 47. The five eggs 1 transferred onto the conveyor 47 are further conveyed in the direction of C on said conveyor 47 and thence transferred onto the conveyor 50. The lifting device 51 is operated upon passage of a predetermined period of time after receiving five object pass detection signals from the detector 49. Said predetermined period of time corresponds to the time in which the five eggs transferred onto the conveyor 50 are conveyed thereon in the direction of D and stopped by the gate 53 to form a row of said five eggs. When said device 51 is operated, its arms 56 suck up the five eggs staying still forming a row on the conveyor 50 as said above and bring them into one side of a packaging container 57. Upon completion of this operation by the device 51, the gate 53 is raised up so that the containers 2 from which the eggs have been removed are further conveyed in the direction of D and discharged out, after which the gate 53 is again lowered down. In the last half of one cycle of packaging operating, the gates 30 and 33 are opened until one object detection signal is issued from each of the detectors 43 and 46 while the gate 32 is also opened until three object detection signals are issued from the detector 45, and in the same way as described above, the five eggs are conveyed on the conveyor 47, transferred onto the conveyor 50 and conveyed thereon in the direction of D until they are stopped by the gate 53 to form a row of said five eggs, whereupon the device 51 is operated to suck up said five eggs and bring them into the other side of said packaging container 57. When the total ten pieces of egg are properly placed in the container 57, an operation completion signal is issued from the device 51 to the control unit 8 which, upon receiving this signal, operates the motor 59 to carry the container 57 packed with 10 pieces of egg in the direction of E on the conveyor 60 and discharge it out, after which the movement of the conveyor 60 is stopped. A new empty container 57 is then placed on the conveyor 60 either automatically or manually. When this cycle of packaging operation is ended, the next cycle of same packaging operation is started, followed by the succeeding cycles in the same way. The turning motion of each of the gates 15-20 and the opening and closing of the gates 28-33 are conducted non-synchronously, so that the control unit 8 has, independently of each other, a section for managing the turning motion of the gates 15-20 and a section for managing the opening and closing of the gates 28-33 and gate 53 and the operation of the device 51 and motor 59.

While the present invention has been described regarding an embodiment thereof by using hen's eggs as the object to be packed and by specifying weight as the physical characteristic of the object to be packed, the invention is not limited to such embodiment; the object to be packed may, for instance, be fruits and also color, size or shape may be specified as the physical characteristic of the object to be packed. Further, instead of providing the gates 15-20, an extruding device 82 comprising a linear motor 80 and a pushout plate 81 moved by said motor 80 may be provided in correspondence to the conveyors 9-14, thereby to let each egg 1 conveyed on the conveyor 5 transfer onto any of the conveyors 9-14 which is selected according to the weight of the egg.

What is claimed is:

1. A packaging apparatus comprising:
   means for successively conveying objects to be packed,
   means for successively detecting a physical characteristic of each object to be packed which is conveyed by said conveyor means,
   means connected to said detecting means for sorting out said conveyed objects according to a difference of the physical characteristic,
   a plurality of means for separately accumulating the thus sorted-out objects according to the difference of the physical characteristic,
   forming means for successively taking out from the respective accumulating means the objects by numbers predetermined with respect to the respective accumulating means said predetermined numbers being variably set so that objects belonging to the respective physical characteristics are combined in a desired ratio in one unit of a packaging container, while maintaining total of the thus combined objects at a predetermined number of pieces of the objects which are to be packed into said one unit of the packaging container, and for forming a set of a predetermined number of pieces of said objects,
   means for placing said set of objects formed by said forming means into said packaging container,
   said sorting mean comprises a first conveyor for receiving the objects successively conveyed from the detecting means, and a plurality of devices for respectively cross-transferring the objects on the first conveyor in a direction crossing a direction of conveyance of the first conveyor according to the difference of physical characteristic of the objects, said cross-transferring devices being spaced apart from each other along the direction of conveyance of the first conveyor,
   said plurality of accumulating means comprise a plurality of conveyors positioned at their one ends on one side of the first conveyor so as to associate with respective cross-transferring devices and extending in the direction crossing the direction of conveyance of the first conveyor, and a plurality of gate devices, each of which is disposed at the other end of each of the plurality of conveyors, said gate devices being adapted to prevent the respective objects on the plurality of conveyors from being conveyed beyond the other ends so as to accumulate the objects cross-transferred by the respective cross-transferring devices on each of the plurality of conveyors,
   said forming means comprises a second conveyor disposed along the respective other ends of said plurality of conveyors and a device for opening the respective gate devices so as to be able to respectively take out from the respective accumulating means the objects by the number predetermined with respect to the respective accumulating means.

2. The packaging apparatus according to claim 1, in which said detecting means comprises a weight detector for detecting a weight of each object to be packed as the physical characteristic, and said sorting-out means is adapted to sort out said conveyed objects into groups of predetermined different weight divisions according to the weight of each object detected by said weight detector.

3. The apparatus according to claim 1 or 2, in which said plurality of accumulating means comprises first and second groups, said forming means operates to firstly take out from respective accumulating means of the first group the objects by the number predetermined with respect to said respective accumulating means of the first group in a first half cycle of a taking-out operation which is carried out in said forming means to thereby form a first set of half the predetermined number of pieces of the objects and to secondly take out from respective accumulating means of the second group the objects by the number predetermined with respect to said respective accumulating means of the second group in the last half cycle of the taking-out operation to thereby form a second set of half the predetermined number of pieces of the objects, said placing means being adapted to introduce respective objects of said first set into the packaging container and thereafter to introduce respective objects of said second set into the packaging container in which the objects of first set are received.

4. The apparatus according to claim 3, in which said first and second groups each includes half the number of the plurality of accumulating means.

5. The apparatus according to claim 1 or 2, in which said placing means comprises a third conveyor disposed adjacently to an end of the second which is situated in a down-stream side with respect to a direction of conveyance of the second conveyor and a device for placing the set of objects received on the third conveyor into the packaging container.

6. The apparatus according to claim 1 or 2, in which the objects to be packed are hen's eggs.

7. The apparatus according to claim 1 or 2, in which the objects to be packed are fruits.

* * * * *